United States Patent [19]

Gale

[11] 3,776,579
[45] Dec. 4, 1973

[54] COUPLING ASSEMBLIES
[75] Inventor: Edwin J. Gale, Aurora, Colo.
[73] Assignee: Stanley Aviation Corporation, Denver, Colo.
[22] Filed: Mar. 11, 1971
[21] Appl. No.: 123,234

[52] U.S. Cl. .............................. 285/233, 285/373
[51] Int. Cl. ........................................... F16l 27/04
[58] Field of Search ................... 285/233, 234, 408, 285/373, 420, 365

[56] References Cited
UNITED STATES PATENTS
2,941,823   6/1960   Good ................................. 285/408
3,223,438   12/1965  DeCenzo ........................... 285/233
3,048,427   8/1962   Mahoff et al. .................. 285/233 X
2,883,211   4/1959   Grass ................................. 285/233
2,756,079   7/1956   Herman ............................. 285/408
3,495,853   2/1970   Furrer ................................ 285/81

FOREIGN PATENTS OR APPLICATIONS
951,003    3/1964   Great Britain .................... 285/233
1,557,301  1/1969   France .............................. 285/420

Primary Examiner—Andrew V. Kundrat
Attorney—Strauch, Nolan, Neale, Nies & Kurz

[57] ABSTRACT

A coupling assembly for interconnecting the adjacent ends of a pair of tubular members and comprising a pair of flange members respectively receiving and fixed to the adjacent ends of the tubular members, a pair of deformable seal rings seated in outwardly open grooves on the flange members, a sleeve telescopically receiving the flange members and bridging the space between the seal rings to engage the seal rings for establishing fluid tight seals between the sleeve and the flange members, a longitudinally split coupler peripherally surrounding the seal ring-engaging sleeve and having radial shoulders that are abuttable with shoulders on the flange members to limit axial movement of the flange members away from each other, and a fastening means for securing the halves of the split coupler circumferentially around the seal ring-engaging sleeve.

5 Claims, 10 Drawing Figures

PATENTED DEC 4 1973 3,776,579
SHEET 1 OF 3
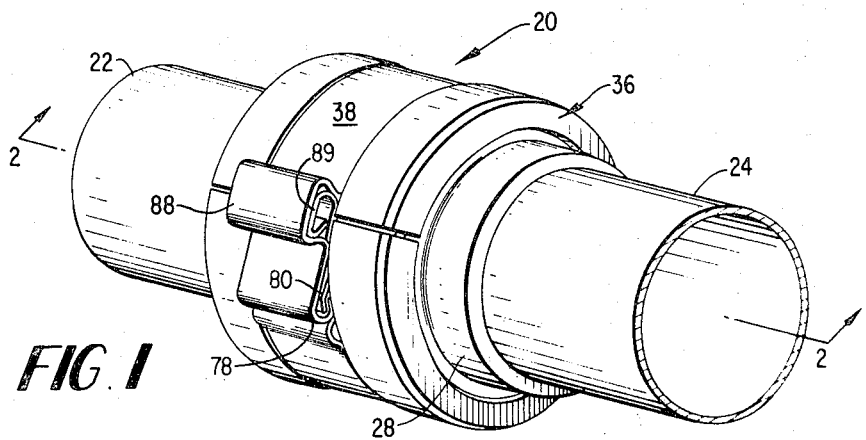
FIG. 1
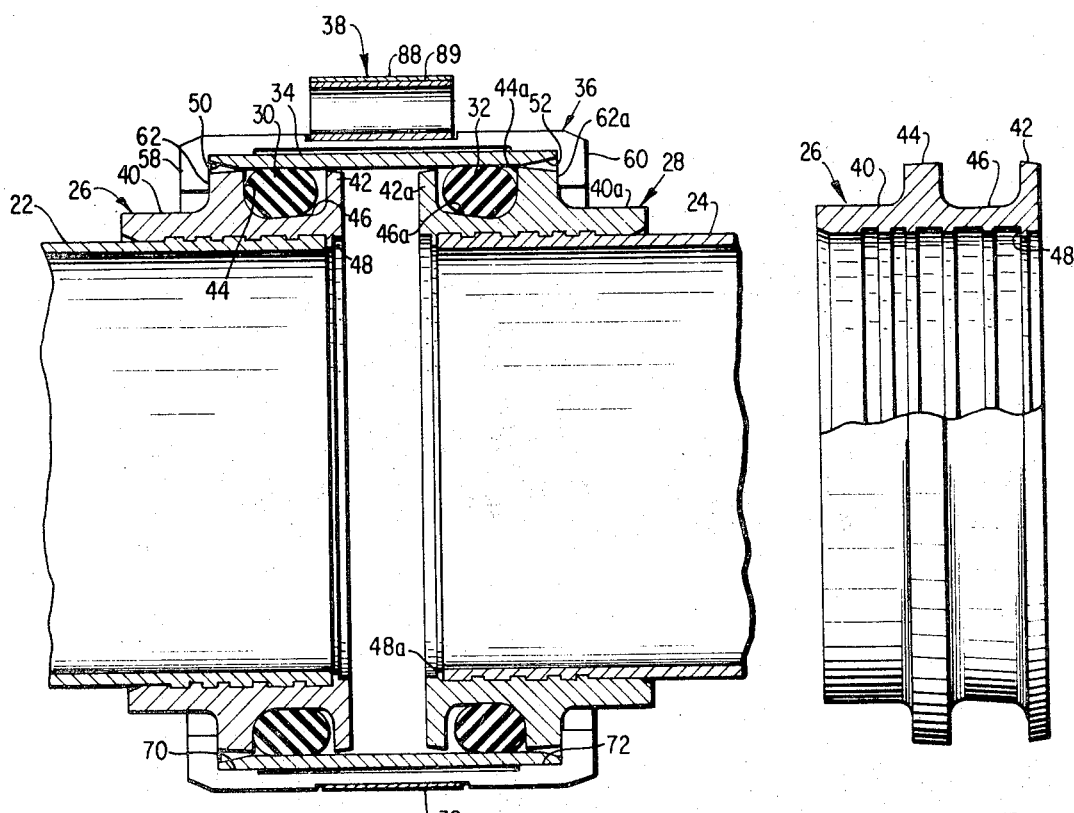
FIG. 2
FIG. 3
INVENTOR
EDWIN J. GALE
BY Strauch, Nolan, Neale, Nies & Kurz
ATTORNEYS

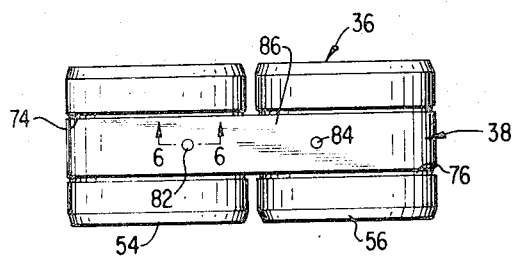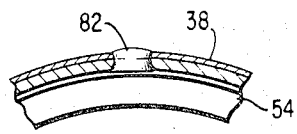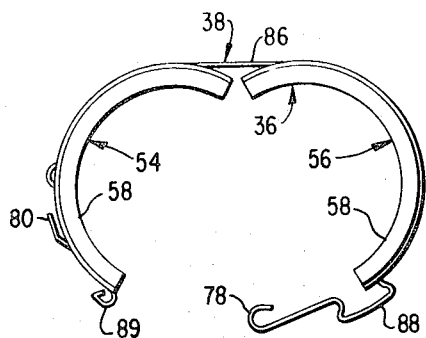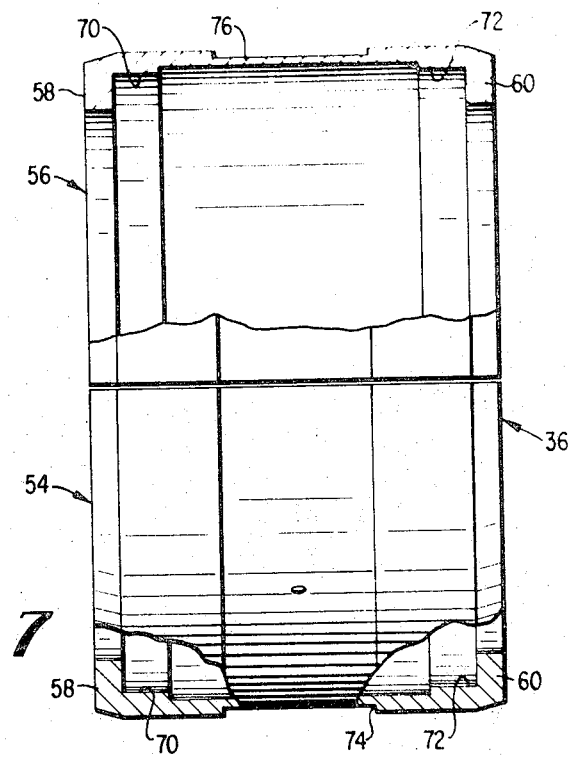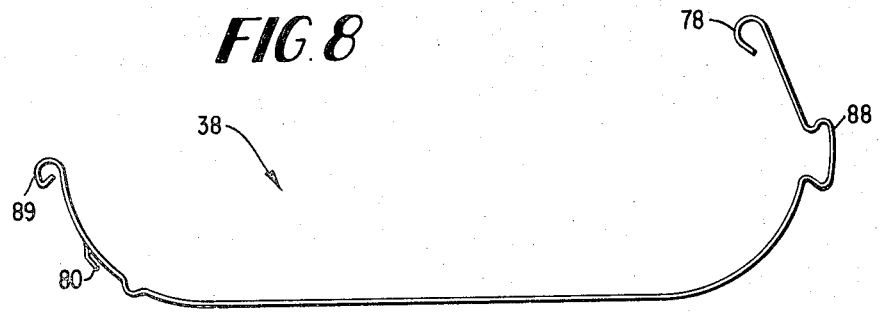
INVENTOR
EDWIN J. GALE

INVENTOR
EDWIN J. GALE

COUPLING ASSEMBLIES

FIELD OF INVENTION

This invention relates to couplings for interconnecting a pair of tubular members and especially to couplings for interconnecting lines that convey fluid under pressure.

BACKGROUND

In the type of threadless coupling described in U.S. Pat. No. 3,495,853 issued to E. Furrer on Feb. 17, 1970, axial load resulting from internal pressure is objectionably carried by radial beads that are integrally formed on the coupled ends of the tubes. Furthermore, such couplings are only applicable to tube or pipe material that can be deformed for the purpose of forming the above-mentioned beads. After the tube ends are prepared in this type of coupling, assembly of a considerable number of parts is required to complete the coupling between the two pipe ends.

SUMMARY & OBJECTS OF INVENTION

One of the major objects of this invention is to provide a novel coupling assembly which overcomes the foregoing objections to the type of prior couplings mentioned above.

According to one embodiment of this invention a pair of flange members are fixed on the adjacent ends of the tubular members to be coupled together, and resilient seal rings are seated in outwardly opening grooves that are formed in the flange members. A sleeve, peripherally surrounding the flange members, axially bridges the space between the seal rings, and the seal rings are compressively engaged by the sleeve to establish a fluid tight seal between the sleeve and the flange members. A longitudinally split coupler, peripherally surrounding the seal ring-engaging sleeve, has radial shoulders which are abuttable with radial shoulders on the flange members to limit relative axial movement of the tubular members away from each other. The seal ring-engaging sleeve is axially confined between the radial shoulders of the split coupler. A spring clip is mounted on the split halves of the coupler to releasably secure the coupler halves together.

With the foregoing construction, line fluid pressure tending to urge the coupled pipe ends axially away from each other causes the radial shoulders on the flange members to bear against the radial shoulders on the split coupler. As a result, axial loading is resisted and thus carried by the radial shoulders on the flange members. Since the flange members are formed separately from the tubular members to be coupled together, it will be appreciated that the material for fabricating the flange members may be selected to provide sufficient strength for resisting axial loading without deformation.

In this invention, the previously mentioned spring clip is pre-assembled on the split coupler. Thus, after the seal rings are seated in their grooves, it is only necessary to mount the seal ring-engaging sleeve in place, mount the coupler in place around the sleeve, and fasten the fastenable ends of the spring clip to complete the coupling. The coupling construction of this invention therefore provides for a relatively quick and easy assembly of the coupling parts for coupling a pair of tubular members together. In addition, the seal rings are readily accessible for inspection and/or replacement simply by unlatching the spring clip to release the split coupler and then by sliding the seal ring-engaging sleeve axially to one side or the other.

The previously mentioned flange members are adapted to be swaged on the ends of the tubular members to be interconnected. Thus, the assembly of this invention provides a threadless coupling for interconnecting a pair of tubular members.

In the coupling assembly of this invention, the flange members concentrate the sealing and axial load bearing functions in close proximity to each other. By virtue of this feature, angulation of the tubular members relative to the coupling is made practical. Such angulation is not permitted in the type of coupling described in U.S. Pat. No. 3,495,853.

With the foregoing in mind, another major object of this invention is to provide a novel threadless coupling for interconnecting a pair of tubular members.

Another important object of this invention is to provide a novel coupling assembly which is inexpensive to manufacture, has relatively few parts, and is easy to assemble and disassemble.

DESCRIPTION OF DRAWINGS

FIG. 1 is a perspective view illustrating a coupling assembly incorporating the principles of this invention for coupling a pair of tubular members together;

FIG. 2 is a longitudinally section taken substantially along lines 2—2 of FIG. 1;

FIG. 3 is a partially sectioned elevation of one of the flange members shown in FIG. 2;

FIG. 4 is an end elevation of the assembly of the longitudinally split coupler and spring clip shown in FIGS. 1 and 2;

FIG. 5 is a top plan view of the assembly shown in FIG. 4;

FIG. 6 is a section taken substantially along lines 6—6 of FIG. 5;

FIG. 7 is a partially sectioned elevation of the split coupler shown in FIGS. 1, 2, and 3;

FIG. 8 is an elevation of the spring clip shown in FIGS. 1, 2, and 4;

DETAILED DESCRIPTION

Figure 9:
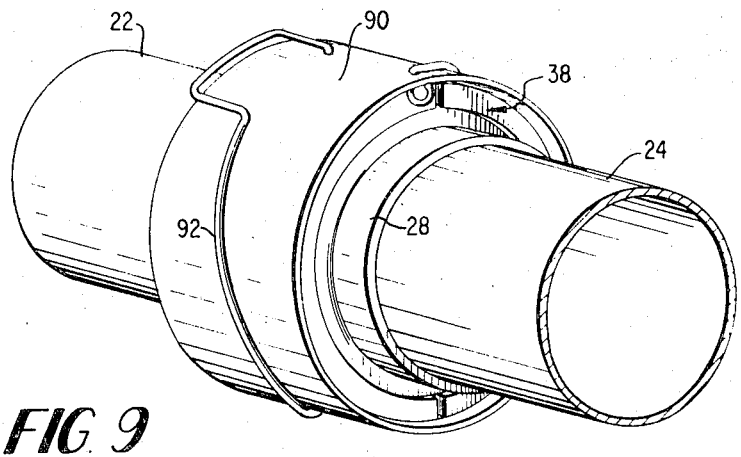
FIG. 9 is a perspective view of a coupling assembly according to another embodiment of this invention.

Referring to the drawings and more particularly to FIG. 1, the coupling assembly incorporating the principles of this invention is generally designated at 20. As shown, coupling assembly 20 couples together the adjacent ends of a pair of tubular members 22 and 24. Tubular members 22 and 24 may be pipes or conduits for conveying fluid under pressure.

As shown in FIGS. 1 and 2, coupling assembly 20 comprises a pair of annular flanges 26 and 28, a pair of resilient O-rings or sealing rings 30 and 32, a seal ring-retaining sleeve 34, a split coupler or sleeve 36 and a spring clip 38. Flanges 26 and 28 are coaxially swaged on the adjacent ends of tubular members 22 and 24. Seal rings 30 and 32 may be formed from any suitable elastically deformable material.

As shown in FIGS. 2 and 3, flange 26 is integrally formed with an annular body portion 40 that interfittingly and coaxially receives the end of member 22 with a swaged, fluid tight fit. Flange 26 is also formed with a pair of axially spaced apart, annular shoulders 42 and 44 that extend radially outwardly from body portion 40 to define therebetween an annular, radially outwardly opening seal ring groove 46. Shoulder 42 is in the form of a lip that defines the inner, axially directed end face of flange 26 adjacent to the end of tubular member 22 to be coupled with the adjacent end of member 24.

Still referring to FIGS. 2 and 3, shoulder 44 extends from an intermediate region of body portion 40 axially between opposite ends of the flange. Flange 26 is integrally formed with an internal annular shoulder 48 that is adapted to seat against the adjacent end face of tubular member 22 to properly axially position flange 26 on member 22. Shoulder 48 is formed slightly axially inwardly from the end face that is defined by shoulder 42. Flange 26 is formed as one piece from any suitable material.

As shown in FIG. 2, flange 28 is of the same construction as flange 26. Accordingly, like reference numerals suffixed by the letter $a$ have applied to designate like portions of flange 28.

Still referring to FIG. 2, seal rings 30 and 32 are respectively seated in grooves 46 and 46$a$. Sleeve 34 axially bridges or spans the space between the opposed ends of flanges 26 and 28 and peripherally surrounds the externally shouldered portions of flanges 26 and 28. The externally shouldered regions of flanges 26 and 28 together with rings 30 and 32 are telescopically slidably received in opposite ends of the sleeve.

Grooves 46 and 46$a$ are sufficiently shallow so that the outer peripheral portions of seal rings 30 and 32 protrude radially beyond their respective pairs of groove-defining shoulders. Seal rings 30 and 32 are compressively deformed by bearing engagement with the smooth, cylindrical, inner periphery of sleeve 34. In this manner, ring 30 establishes a fluid tight seal between flange 26 and sleeve 34, and ring 32 establishes a fluid tight seal between flange 28 and sleeve 34.

Sleeve 34 is relatively thin and has a uniform outer diameter. The inner diameter of sleeve 34 is also uniform except for beveled or outwardly flared surfaces 50 and 52 (see FIG. 2) at opposite ends of the sleeve. Each of these flared surfaces slopes toward the outer sleeve periphery in a direction extending toward its adjacent end of sleeve 34. When flanges 26 and 28 are spaced axially apart by the maximum distance shown in FIG. 2, surfaces 50 and 52 respectively peripherally surround shoulders 44 and 44$a$. As a result, the sub-assembly of flange 26 and tubular member 22 and the sub-assembly of flange 28 and member 24 each may be angulated to a limited degree relative to sleeve 34 by virtue of the added clearances provided by surfaces 50 and 52.

Thus, the sub-assembly of flange 26 and tubular member 22 may be positioned so that it is axially aligned with sleeve 34 or it may selectively be angulated or tilted relative to sleeve 34 so that the axis of the sub-assembly transversely intersects the axis of sleeve 34. Similarly, the sub-assembly of flange 28 and tubular member 24 may be positioned so that it is axially aligned with sleeve 34 or it may selectively be angulated or tilted to a limited degree so that the axis of the sub-assembly transversely intersects the axis of sleeve 34.

With the foregoing construction it will be appreciated that surfaces 50 and 52 of sleeve 34 accommodate limited misalignment of each tubular member relative to sleeve 34. At the same time, however, the construction is such that the seals provided by rings 30 and 32 are not disestablished when either of the tubular members 24 and 22 is angulated or tilted relative to sleeve 34. In this respect it will be noted that the annular sealing interface between ring 30 and sleeve 34 and the annular sealing interface between ring 32 and sleeve 34 are axially between surfaces 50 and 52. A radial clearance is provided between sleeve 34 and shoulders 42, 44, 42$a$, and 44$a$ to allow the sub-assembly of flange 26 and member 22 and the sub-assembly of flange 28 and member 24 to slide axially relative to sleeve 34 and to each other.

Referring now to FIGS. 4 and 7, coupler 36 is of annular configuration and is longitudinal split to provide two complemental coupler halves which are respectively indicated at 54 and 56. Coupler 36 is split in a radial plane containing the longitudinal coupler axis so that each of the coupler halves 54 and 56 arcuately extends substantially 180° in the assembled coupler.

Coupler 36 peripherally and coaxially surrounds sleeve 34, and spring clip 38, as will be described in greater detail later on, releasably secures the coupler halves together in assembled relation circumferentially around sleeve 34. Coupler halves 54 and 56 are substantially the mirror image of each other, and each of the coupler halves terminates at its axially spaced apart ends in radially inwardly extending shoulders or flanges 58 and 60 (see FIGS. 2 and 7). In assembled relation shoulders 58 are contained in a common radial plane, and shoulders 60 are also contained in a common radial plane.

In assembled relation, shoulders 58 are disposed axially outwardly of shoulder 44, so that the axially directed interior surfaces of shoulders 58 are in axially opposing relation with that axially directed end face 62 of shoulder 44 which faces axially away from groove 46. Similarly, shoulders 60 are disposed axially outwardly of shoulder 44$a$ so that the axially directed interior surfaces of shoulders 60 are in axially opposing relation with that axially directed end face 62$a$ of shoulder 44$a$ which faces axially away from groove 46$a$.

With the foregoing construction relative axial displacement of flanges 26 and 28 away from each other is limited by abutment of shoulder 44 with shoulders 58 and by abutment of shoulder 44$a$ with shoulders 60. Shoulders 58 and 60 are axially spaced sufficiently far apart to provide the maximum spacing between flanges 26 and 28 that is shown in FIG. 2.

Thus when fluid under pressure is supplied through tubular members 22 and 24, the pressure of the fluid will be applied to the axially opposed end faces of flanges 26 and 28 tending to urge the sub-assembly of flange 26 and member 22 and the sub-assembly of flange 28 and member 24 axially apart. This relative, axial movement will be limited by abutment of shoulder 44 with shoulders 58 and by abutment of shoulder 44$a$ with shoulders 60. Fluid under pressure will also pass between sleeve 34 and shoulders 42 and 42$a$ to further deform seal rings 30 and 32. Thus as the fluid pressure increases, the seal-establishing deformation of rings 30 and 32 increases.

From the foregoing it will be appreciated that flanges 26 and 28, in addition to carrying seal rings 30 and 32, also resist and thus absorb the axial loading that results from internal pressure. Since flanges 26 and 28 are formed separately of tubular members 22 and 24 they may be fabricated from a material that has sufficient strength for withstanding this axial loading without objectionable deformation. It also will be observed that the axial load bearing regions and the sealing regions are in close proximity in the coupling construction thus far described. This feature makes practical the previously described angulation of tubular members 22 and 24 relative to the coupling.

Sleeve 34 is axially confined between shoulders 58 and 60 so that axial movement of sleeve 34 is confined by abutment with shoulders 58 in one direction and by abutment with shoulders 60 in the other direction. The axial length of sleeve 34 is such that sleeve 34 does not prevent abutment of shoulder 44 with shoulders 58 and shoulder 44a with shoulders 60. When shoulders 44 and 44a respectively abut shoulders 58 and 60, small clearances exist between the ends of sleeve 34 and radial planes respectively containing surfaces 62 and 62a.

As shown in FIGS. 2 and 7, each of the coupler halves 54 and 56 is formed with a pair of uniformly diametered, cylindrically smooth lands 70 and 72. Lands 70 and 72 are respectively adjacent to shoulders 58 and 60 and interfittingly seat against the smooth, outer periphery of sleeve 34.

Spring clip 38, as shown in FIGS. 1, 4, 5 and 8, is a flat-sided flexible metal strip or band that is seated in radially outwardly opening, circumferentially extending grooves 74 and 76 (see FIGS. 2 and 5). Grooves 74 and 76 are respectively formed in coupler halves 54 and 56 and have equal and uniformly diametered, cylindrically smooth bottom surfaces. Spring clip 38 interfitting seats on the bottom surfaces of grooves 74 and 76 and is confined against axial displacement by abutment with the sides of grooves 74 and 76. Grooves 74 and 76 are formed axially equidistantly between shoulders 58 and 60. Grooves 74 and 76 are circumferentially aligned to thus define an annular groove construction on the outer periphery of coupler 36.

As best shown in FIGS. 1, 4 and 8, spring clip 38 terminates at one end in a hook portion 78 and has a raised tab or ear portion 80 near its opposite end. Portion 78 hooks around tab portion 80 to provide a loop that radially fixes coupler halves 54 and 56 in place peripherally around sleeve 34. An intermediate portion of spring clip 38 bridges the adjacent ends of coupler halves 54 and 56 that are remote from portions 78 and 80, and near these adjacent ends, the intermediate portion of spring clip 38 is permanently and rigidly fixed to coupler halves 54 and 56 respectively by rivets 82 and 84 (see FIGS. 5 and 6) or other suitable fasteners.

Rivets 82 and 84 are the only means securing spring clip 38 to coupler halves 54 and 56. Thus, except for the spring clip regions at rivets 82 and 84, clip 38 is free for movement or flexure relative to coupler halves 54 and 56.

The intermediate spring clip portion bridging the adjacent ends of coupler halves 54 and 56 and extending circumferentially between rivets 82 and 84 is indicated at 86 in FIGS. 4 and 5. Spring clip portion 86 defines a resilient, yieldable hinge between the bridged adjacent ends of coupler halves 54 and 56 to enable coupler halves 54 and 56 to be swung circumferentially apart as shown in FIG. 4, thereby permitting quick and easy assembly of coupler 36 on sleeve 34. Thus, coupler halves 54 and 56 are effectively swingable or pivotal about a flexure axis that extends parallel to the longitudinal axis of coupler 36 and that lies on spring clip portion 86 generally between the bridged, adjacent ends of the coupler halves. In this manner, it will be appreciated that the opposite ends of coupler halves 54 and 56, adjacent to portions 78 and 80, may be spread circumferentially apart as shown in FIG. 4 to provide an open, circumferentially extending mouth for circumferentially receiving sleeve 34 after the sleeve 34 is mounted in place on flanges 26 and 28.

As shown in FIG. 4, hook portion 78 extends circumferentially beyond the adjacent unhinged end of coupler half 56 so that it can easily and conveniently be grasped and flexed to hook or latch it over tab portion 80. Near hook portion 78 and the unhinged end of coupler half 56, spring clip 38 is formed with a bight 88 that enables clip 38 to be resiliently circumferentially extended for easily interengaging portions 78 and 80.

Bight 88 is adapted to seat over and interlock with the backwardly curled spring clip terminal portion 89 in assembled relation.

From the foregoing description it will be appreciated that spring clip 38 defines a yieldable hinge bridging two adjacent ends of coupler halves 54 and 56 to thus hinge the coupler halves together. In addition spring clip 38 defines coacting fastener means or elements (in the form of portions 78 and 80), and by interengaging portions 78 and 80, spring clip 38 forms a loop peripherally and coaxially surrounding coupler 36 to secure coupler halves 54 and 56 against radial movement on sleeve 34.

After flanges 26 and 28 are swaged on the adjacent ends of tubular members 22 and 24, the coupling of this invention is quickly and easily completed by seating seal rings 30 and 32 in grooves 46 and 46a, by telescopically receiving flanges 26 and 28 in sleeve 34 so that sleeve 34 bridges and peripherally engages rings 30 and 32, by then spreading the unhinged ends of coupler halves 54 and 56 circumferentially around sleeve 34, and finally by interengaging portions 78 and 80 to secure the coupler halves in place. Coupler 36 is confined against axial movement in one direction by abutment of shoulders 58 with shoulder 44 and the opposite direction by abutment of shoulders 60 with shoulder 44a.

From the foregoing description it will be appreciated coupling assembly 20 is threadless, has relatively few parts that are required for coupling and uncoupling tubular members 22 and 24, is easy and convenient to couple and uncouple, is relatively inexpensive to manufacture, provides fluid tight seals, and enables the tubular members to be angulated as previously described so that misaligned tubular members can be coupled together without difficulty.

Figure 10:
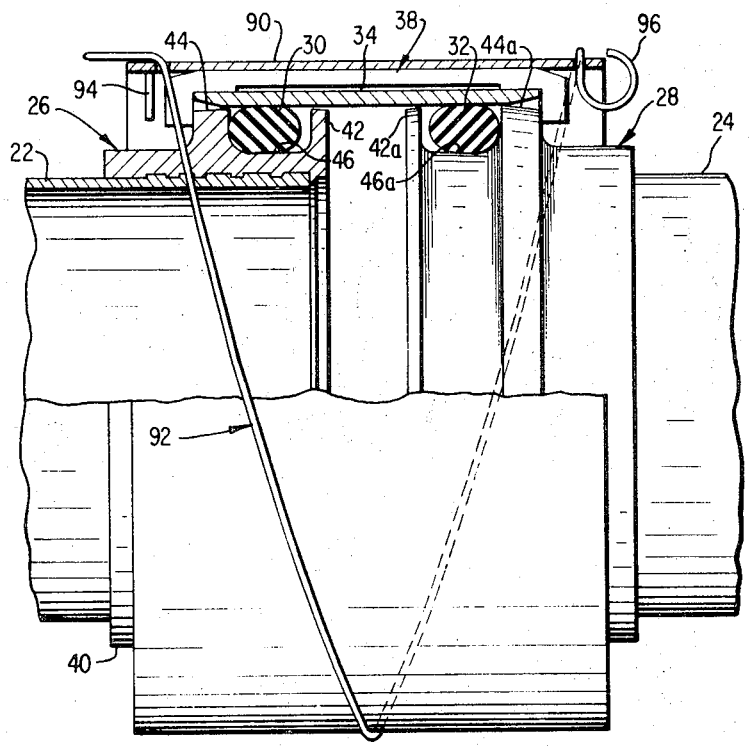
FIG. 10 is a partially sectioned side elevation of the coupling assembly shown in FIG. 9.

The embodiment shown in FIGS. 9 and 10 is the same as that shown in FIGS. 1-8 except that grooves 74 and 76 have been eliminated and spring clip 38 has been replaced by a retainer sleeve 90 and a spring clip 92. Retainer sleeve 90 coaxially and peripherally surrounds coupler 36 to radially confine coupler halves 54 and 56 in place on sleeve 34. Clip 92 is carried by sleeve 90 and is an elongated rod-like member or spring wire of relatively small diameter.

As shown, clip 92 extends circumferentially around the outer periphery of retainer sleeve 90 and has a radially extending terminal portion 94 (FIG. 10) which extends through a small aperture in sleeve 90. Terminal portion 94 projects radially inwardly from sleeve 90 axially adjacent to the axially outwardly directed faces of shoulders 58. The opposite end of clip 92 also extends through an aperture in sleeve 90 in axially spaced apart relation to terminal portion 94, and the other end of clip 92 terminates in a hook 96 which is disposed partially radially inwardly of sleeve 90 axially adjacent to the outwardly directed faces of shoulders 60. Sleeve 90 is confined against axial movement relative to coupler 36 by axial abutment of terminal portion 94 with one of the shoulders 58 and by axial abutment of hook 96 with one of the shoulders 60.

Prior to assembly of the coupling shown in FIGS. 9 and 10, hook 96 may be inserted through its aperture in sleeve 90 to provide an anchor for clip 92, and terminal portion 94 is positioned so that it is disposed outwardly of the retainer sleeve. After flanges 26 and 28 are swaged on members 22 and 24, the foregoing sub-assembly of sleeve 90 and clip 92 is mounted over member 24 axially to one side of flange 28. Rings 30 and 32 then may be seated in grooves 44 and 44a followed by the mounting of sleeve 34 on the externally shouldered portions of flanges 26 and 28. Coupler halves 54 and 56 are then placed circumferentially around sleeve 34 and held in place as the sub-assembly of sleeve 90 and clip 92 is slid axially to coaxially receive coupler 36. The coupling is then completed by inserting terminal portion 94 radially through its aperture in sleeve 90.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within th meaning and range of equivalency of the claims are therefore intended to be embraced therein.

What is claimed and desired to be secured by Letters Patent is:

1. An assembly for coupling together the adjacent ends of a pair of fluid passage-defining tubular members, said assembly comprising a pair of seal ring-mounting members of tubular configuration, said seal ring-mounting members being formed separately of said tubular members and adapted to be fixed respectively to said adjacent ends of said tubular members, coupling means comprising a longitudinally split sleeve peripherally surrounding said seal ring-mounting members and having radially extending axially spaced apart oppositely facing abutment portions that are respectively separably abuttable with said seal ring-mounting members for limiting relative axial movement of said adjacent ends away from each other, said seal ring-mounting members having radially outwardly opening annular seal ring grooves, a deformable seal ring seated in each of said grooves, sleeve means peripherally surrounded by said coupling means and disposed axially between said axially spaced apart abutment portions, said sleeve means axially surrounding and bridging the space between said seal rings, and said seal rings being engaged and deformed by said sleeve means to establish a fluid tight seal between said sleeve means and each seal ring-mounting member, and a combined retainer and circumferentially tensioned spring clip assembly extending around said split coupling sleeve to thereby retain said split coupling sleeve closely surrounding said sleeve means, and cooperating means on said combined retainer and spring clip assembly and said split coupling sleeve for preventing longitudinal displacement of said combined retainer and spring clip assembly relative to said split coupling sleeve, said combined retainer and spring clip assmbly comprising a retainer sleeve closely surrounding said split coupling sleeve and a length of spring wire extending around said retainer sleeve and having end sections attached to said retainer sleeve and adapted to abut opposite ends of said split coupling sleeve.

2. In an assembly for coupling together adjacent ends of a pair of fluid passage-defining tubular members, a pair of flange members adapted to be rididly fixed respectively to said adjacent ends of said tubular members, said flange members being respectively formed with first and second annular radially outwardly extending shoulder portions, sleeve means peripherally surrounding said flange members, resilient seal rings radially compressed between said sleeve means and said flange members, a coupling sleeve structure mounted on and peripherally surrounding said sleeve means, said coupling structure having axially spaced apart radially extending shoulders that are axially abuttable with said first and second annular portions respectively for limiting relative axial displacement of said flange members away from each other, said coupling structure being longitudinally split to provide a pair of coupling halves extending circumferentially around portions of said sleeve means and having two pair of circumferentially adjacently disposed ends, and a combined retainer and spring clip assembly comprising a one-piece flexible band extending peripherally around said coupling structure and having integral resilient end fastener portions including cooperating interengageable hook and tab means, and a bight formed in said band to enable said band to be resiliently circumferentially extended so that said hook and tab means may be releasably interengaged to form a loop for radially confining said coupling halves in assembled relation around said sleeve means, said band having an integral intermediate flexure portion bridging one pair of said circumferentially adjacently disposed ends and fixed to said coupling halves to provide a yieldable hinge interconnecting said one pair of circumferentially adjacently disposed ends and enabling the other pair of said circumferentially adjacently disposed ends to be spread circumferentially apart when said fastener portions are disengaged for mounting said coupling structure on and for removing said coupling structure from said sleeve means.

3. The assembly defined in claim 2, wherein the inner peripheral surface regions at axially opposite ends of said sleeve means are flared radially outwardly to provide clearances that enable each of said flange members to be angulated relative to said sleeve means.

4. The assembly defined in claim 2, wherein said band is seated and longitudinally confined in radially outwardly opening circumferentially extending grooves extending around said coupling halves.

5. In an assembly for coupling together adjacent ends of a pair of fluid passage-defining tubular members, a pair of flange members adapted to be rigidly fixed respectively to said adjacent ends of said tubular members, said flange members being respectively formed with first and second annular radially outwardly extending shoulder portions, sleeve means peripherally surrounding said flange members, resilient seal rings radially compressed between said sleeve means and said flange members, a coupling sleeve structure mounted on and peripherally surrounding said sleeve means, said coupling structure having axially spaced apart radially extending shoulders that are axially abuttable with said first and second annular portions respectively for limiting relative axial displacement of said flange members away from each other, and said coupling structure being longitudinally split to provide a pair of coupling halves extending circumferentially around portions of said sleeve means and having two pairs of circumferentially adjacently disposed ends, and a combined retainer and spring clip assembly comprising a band formed from a flat sided strip of flexible material and extending peripherally around said coupling structure, said band having resilient end portions that are releasably interengageable to form a loop for radially confining said coupling halves in assembled relation around said sleeve means, said band having an integral intermediate flexure portion bridging one pair of said circumferentially adjacently disposed ends and fixed to said coupling halves to provide a yieldable hinge interconnecting said one pair of circumferentially adjacently disposed ends and enabling the other pair of said circumferentially adjacently disposed ends to be spread circumferentially apart when said fastener portions are disengaged for mounting said coupling structure on and for removing said coupling structure from said sleeve means.

\* \* \* \* \*